June 16, 1964

E. L. ADAMS 3,137,034

ELASTIC MELT EXTRUDER AND METHOD OF OPERATION

Filed Dec. 14, 1960

ELMER L. ADAMS
*INVENTOR.*

BY W.A. Schaich
Charles S. Lynch

ATTORNEYS

June 16, 1964  E. L. ADAMS  3,137,034
ELASTIC MELT EXTRUDER AND METHOD OF OPERATION
Filed Dec. 14, 1960  2 Sheets-Sheet 2

ELMER L. ADAMS
INVENTOR.

BY
ATTORNEYS

United States Patent Office 3,137,034
Patented June 16, 1964

3,137,034
ELASTIC MELT EXTRUDER AND METHOD
OF OPERATION
Elmer L. Adams, Toledo, Ohio, assignor to Owens-
Illinois Glass Company, a corporation of Ohio
Filed Dec. 14, 1960, Ser. No. 75,702
5 Claims. (Cl. 18—12)

The present invention relates to an elastic melt extruder and to a method of operating such an extruder. More particularly this invention relates to an elastic melt extruder adapted for the issuance of plastic material at pressures different from the pressures generated by the normal operation of the extruder.

There has been recently developed a new type of plasticizer-extruder, commonly known as an "elastic melt extruder" utilizing "the normal force effect," i.e. the normal force developed when a visco-elastic material is sheared between a rotating plate and a stationary plate, to perform the functions of a conventional plasticizer-extruder. Such an elastic melt extruder is described in detail in "Modern Plastics Magazine" of October, 1959, at page 107, in an article by Bryce Maxwell and Anthony J. Scalora.

Such an elastic melt extruder utilizes a power-driven, rotatable disc operable within a convolute chamber to which solid plastic material is furnished from a supply hopper or the like. A radial face of the disc is spaced through a narrow gap from the corresponding face of an orifice plate having an exit orific axially aligned with the disc. As the disc is rotated, the thermoplastic material introduced peripherally of the disc and confined between the radial shearing faces of the disc and the orifice plate is subjected to shearing forces. The thermoplastic material is essentially elastic and the tendency of the sheared material for elastic recovery after arcuate shearing and stretching between the radial faces effects centripetal flow of material between the disc and the orifice plate toward the central orifice, the material issuing from the orifice in plasticized condition at a predetermined pressure.

The conventional elastic melt extruder as above described, and as set forth in the Maxwell and Scalora article, is capable of issuing extrudate at only relatively low pressures. Additionally, the elastic melt extruder is inherently a continuously operating device from which extrudate issues continuously, so long as solid plastic material is supplied to the shearing zone.

The present invention now provides a device which constitutes an improvement on the basic elastic melt extruder and which adapts such an extruder to the issuance of plastic material at pressures different from, and preferably greater than, the pressures generated in the searing zone of the extruder. Additionally, the extruder may be adapted to intermittent operation, if such operation is desired.

More specifically, the present invention proposes supplementing the output of an elastic melt extruder with a pressure-applying element deriving power from an external source and capable of displacing plasticized material from the shearing zone under a pressure different from that generated within the extruder. Most conveniently, the external source of pressure may comprise a fluid pressure cylinder having a piston rod displaceable axially of the shearing disc through the shearing zone and into the extruder outlet orifice to displace plasticized material from the extruder under the pressure of the power element.

In the event that continuous issuance of extrudate is desired, multiple pistons may be utilized in conjunction with valve means for insuring the successive issuance of extrudate from the pistons, those pistons not issuing extrudate being conditioned for subsequently issuing extrudate previously accumulated. In the event that intermittent extrudate operation is desired, a single piston may be utilized in conjunction with a valve preventing the issuance of extrudate from the extruder between successive issues of extrudate by the piston.

It is, therefore, an important object of the present invention to provide an improved elastic melt extruder adapted for the issuance of plastic material at pressures different from the pressures generated within the extruder.

Another important object of the present invention is the provision of an elastic melt extruder provided with a power displaceable piston operable to express plasticized material from the shearing zone of the extruder at pressures greater than those pressures generated within the shearing zone of the extruder.

It is a further object of this invention to provide an elastic melt extruder capable of continuously issuing extrudate at a pressure greater than the pressure generated within the shearing zone of the extruder, the extrudate pressure being generated by a plurality of successively actuated power elements.

Yet another important object of this invention is the provision of an elastic melt extruder capable of intermittent operation and in which material plasticized in the extruder shearing zone is accumulated for subsequent expression therefrom by a power displaceable element and at a pressure greater than the pressures generated within the shearing zone.

It is still another, and no less important, object of the present invention to provide a method of operating an elastic melt extruder by expressing material from the extruder shearing zone at a pressure other than that generated within the zone during the plasticizing of material.

Other objects of this invention will appear in the following description and appended claims, reference being had to the accompanying drawings forming a part of this specification wherein like reference characters designate corresponding parts in the several views.

Figure 1:
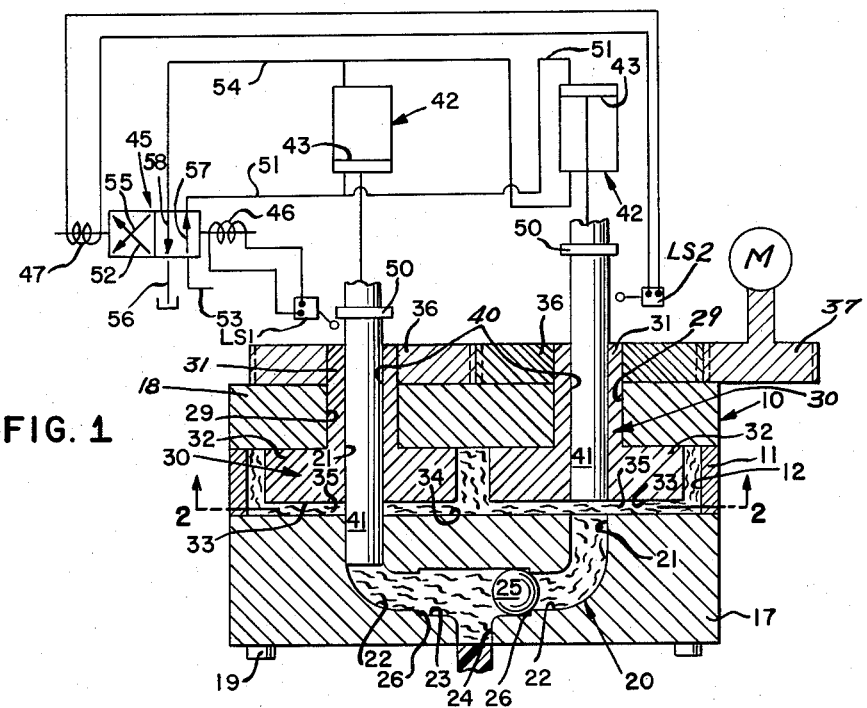
FIGURE 1 is a horizontal sectional view of an extruder of the present invention illustrated somewhat schematically and utilized in conjunction with a schematically illustrated control system.

In FIGURE 1, reference numeral 10 refers generally to an elastic melt extruder of the present invention and including a central casing section 11 having a central opening 12 defining a pair of interior convolute chambers 13, each communicating through an upper, centrally located inlet opening 14 with a hopper 15 superimposed on the casing section 11 and secured thereto by suitable means. The open ends of the central casing section 11 are closed by a front plate 17 and a rear plate 18, respectively, secured to the central casing section 11 by suitable means, as by tie bolts 19.

The front plate 17 is provided with an outlet passage indicated generally at 20 and comprising a plurality of orifices 21, two such orifices being provided in the illustrated embodiment of the invention, merging (as at 22) into a central enlarged passage 23 communicating with a central outlet opening 24. Trapped in the enlarged passage 23 is a central, free-floating check valve element or ball 25 alternately seatable upon spaced radially enlarged valve seats 26 formed at either end of the passage 23 by its juncture with the reduced joining portions 22.

The rear plate 18 is provided with a pair of bores 29 axially aligned with the orifices 21, respectively, journalling rotatable shearing discs indicated generally at 30, respectively. These shearing discs 30 each comprise cylindrical shank portions 31 journalled in the plate openings 29 and radially enlarged disc portions 32 disposed within the chambers 13, respectively. The disc portions 32 of the shearing discs 30 are provided with forward circular shearing faces 33 which cooperate with the internal shearing surfaces 34 of the front plate 17 to define therebetween adjacent shearing chambers 35.

The shank portions 31 of the shearing elements 30 each have secured thereto a gear or pinion 36 meshing with one another, one of such gears being in mesh with a drive pinion 37 driven by suitable means, as a motor M.

The structure thus far provided forms an elastic melt extruder having multiple interior convolute chambers 13 to which particulated plastic material is fed from the hopper 15 through the inlet opening 14 common to both chambers. The material so introduced passes the periphery of the shearing discs 32 and enters the shearing zones 35 defined between the shearing faces 33 of the discs 30 and the chamber end face 34 defined by the inner surface of the front element 17. Such material within the shearing chambers 35 normally would be fed under the internal plasticizing pressures developed in the chambers 35 through the orifices 21, the joining portions 22 and the transverse passage 23 to the outlet opening 24 from which the plasticized material issues as extrudate. Of course, the gap between the disc faces 33 and the chamber wall surface 34 is greatly exaggerated for purposes of illustration and it will be appreciated that extrudate issues from the opening 24 at a pressure determined by the speed of rotation of the discs 30, the cross-sectional dimension of the shearing chambers 35, the size of the orifices 21, and other structural characteristics of the elastic melt extruder.

The rotatable shearing disc elements 30 of the present invention are provided with central or axial bores 40 aligned with the orifices 21 and within which are disposed fluid pressure actuated plungers 41, such plungers forming part of fluid actuated cylinders 42, respectively, such cylinders having pistons 43 displaceable therein and joined to the plungers 41 for co-movement.

Actuation of the cylinders 42 will reciprocate the plungers or pistons 41 within the bores 40, respectively, the pistons being extensible across the shearing zones 35 into the respective orifices 21 to displace plasticized material therein toward the extrudate outlet opening 24. The check valve 24 will shuttle laterally in the passage 23, the pressure exerted on the plasticized material within the orifices 21 by that one of the pistons 41 being advanced at any given time displacing the check valve 25 against the opposite seat 26 and preventing the back flow of material pressurized by the given piston 41 into the other of the shearing zones 35.

To effect continuous operation, the cylinders 42 are preferably controlled by a control circuit incorporating a control valve 45 which is actuated by solenoids 46 and 47 actuated by limit switches LS1 and LS2, respectively.

The pistons 41 are provided with collars 50 contactable with the limit switches LS1 and LS2 upon actuation of the pistons into the corresponding orifices 21.

As above explained, the two pistons 41 are alternately advanced and retracted within the bores 40. As illustrated, the actuation of limit switch LS1 by the collar 50 of the left-hand piston 41 will energize solenoid 46 and shift the valve 45 to its illustrated leftward position, hereby connecting conduit 51 leading to the underside of the left-hand fluid pressure actuated cylinder 42 and the upper end of the right-hand fluid actuated cylinder 42 through valve passage 57 to a source of fluid under pressure in supply conduit 53 and connecting the upper end of the left-hand cylinder 42 and the lower end of the right-hand cylinder 42 through conduit 54 and valve passage 58 to a drain conduit 56. Thus, the relative positions of the pistons will be reversed from the illustrated position, the left-hand piston being retracted upwardly and the right-hand piston being forced downwardly. When the right-hand piston collar 50 actuates limit switch LS2, solenoid 47 will be energized to interconnect lines 54 with the pressure line 53 through valve passage 52 and to connect conduits 51 with the drain conduit 56 through valve passage 55.

In this manner, continuous operation of the elastic melt extruder 10 is insured with plastic material being supplied through the extrudate outlet opening 24 at a pressure different from the pressure generated within the shearing zones 35, the pressure at which extrudate issues from the outlet 24 actually being generated by the fluid pressure actuated cylinders 42 completely independently of the pressures generated within the shearing zones. By the utilization of a plurality of sequentially actuated pistons, in combination with the check valve 25, a continuous flow through the outlet 24 can be obtained.

Figure 3:
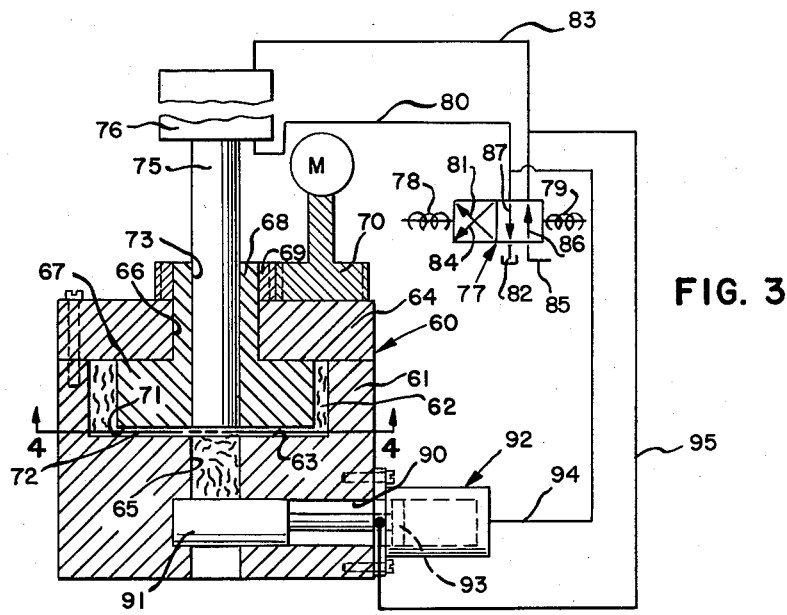
FIGURE 3 is a view similar to FIGURE 1 illustrating an intermittently operating elastic melt extruder of the present invention.
Figure 4:
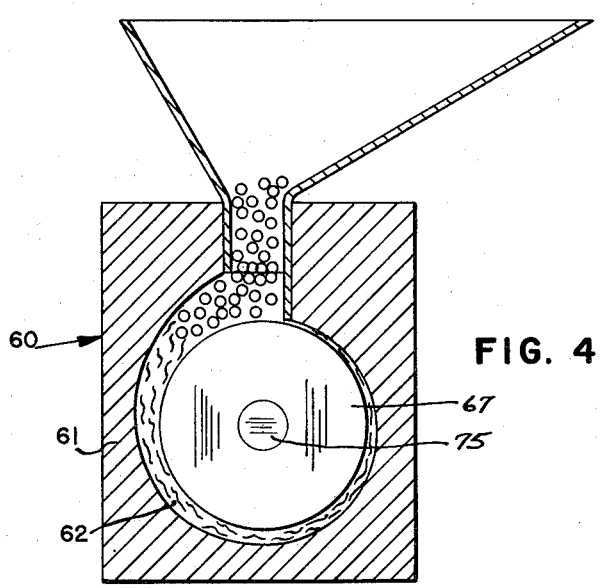
FIGURE 4 is a sectional view taken along the plane 4—4 of FIGURE 3.

In the modified embodiment of applicant's invention illustrated in FIGURE 3 and FIGURE 4 of the drawings, an intermittently operated elastic melt extruder is provided, this elastic melt extruder comprising a casing block 61 enclosing an interior convolute passage 62 having its one axial extremity defined by an interior radial casing wall 63 and its rear extremity defined by a cover plate 64. The casing 61 is provided with an axial outlet orifice 65 communicating with the convolute chamber and located centrally of the shearing surface 63.

The cover plate 64 is bored, as at 66, to rotatably journal therein a rotatable shearing disc 67, the shank 68 of which is provided with a peripheral gear 69 meshing with a driven gear 70 driven by suitable means, as by motor M. The shearing face 71 of the shearing disc 67 cooperates with the shearing surface 63 of the convolute chamber to define therebetween a shearing zone 72. The shearing element 67 is provided with an axial bore 73 within which is reciprocable a plunger or piston 75 actuated by suitable means, as by a fluid pressure actuated cylinder 76 under the control of a solenoid actuated valve 77.

More specifically, the cylinder 76 is actuated from the valve 77 by means of solenoids 78 and 79 which are alternately energized by suitable means, such as a timer or the like. Energization of solenoid 78 will position the valve 77 to connect the lower end of the cylinder 76 through conduit 80 and valve passage 81 to a fluid supply conduit 85 and to connect the upper end of the cylinder 76 through conduit 83 and valve passage 84 to a drain conduit 82. Upon energization of the solenoid 79, conduit 83 is connected to the source of fluid supply 85 through a valve passage 86 and the underside of the cylinder is connected through conduit 80 and valve passage 87 to the drain conduit 82. As illustrated, the valve 77 is positioned to initiate extension of the plunger 75 across chamber 72 and into the orifice 65. Obviously, reversal of the valve 77 by energization of solenoid 78 will retract the plunger 75 to its illustrated position.

The casing block 61 is also provided with a transverse opening 90 communicating with the orifice 65 and slidably supporting therein a tubular valve 91 which is reciprocable within the passage 90, by means of a fluid pressure actuated cylinder 92 to control the issuance of material from the chamber 72. This cylinder 92 has therein a piston 93 actuated by fluid introduced thereinto by conduit 94 to interpose the slide valve 91 across the conduit 65 and thereby prevent the egress of plasticized material from the shearing zone 72 through the orifice 65. The piston is retractable upon the passage of pressure fluid through the line 95 to retract the slide valve and accommodate the issuance of plastic material. The line 94 for extending the slide valve 91 and interrupting the dispensing of plasticized material through the orifice 65 is interconnected with the line 80 for the fluid pressure cylinder 76, so that the slide valve is positioned to prevent the dispensing of plasticized material whenever the piston 75 is withdrawn, and the line 95 is interconnected with the conduit 83 to the upper end of the cylinder 76 so as to withdraw the side valve 91 and accommodate the issuance of plasticized material through the orifice 65 whenever the piston 75 is extended across the shearing zone 72 and into the orifice 65.

The operation of the device illustrated in FIGURE 3 and FIGURE 4 of the drawings is substantially the same as that heretofore described, with the piston 75 expressing material through the orifice 65 whenever the cylinder 76 is appropriately energized by the valve 77 upon energization of the solenoid 79, and the slide valve 91 is automatically withdrawn to accommodate the issuance of material through the orifice.

Figure 2:
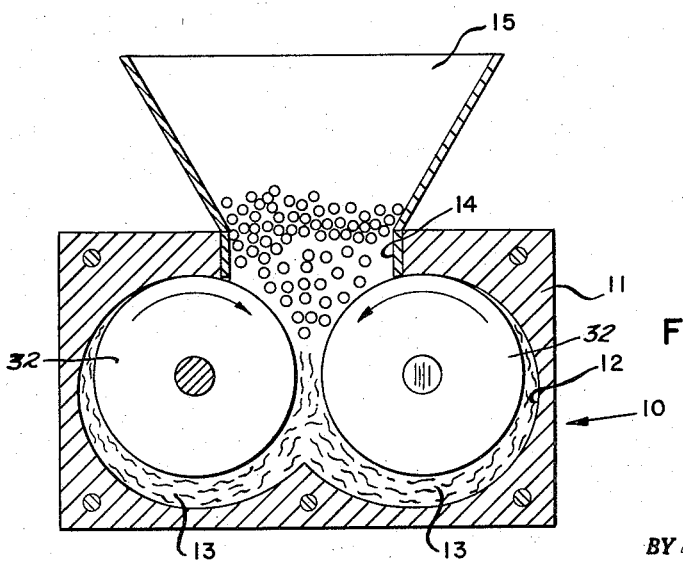
FIGURE 2 is a vertical sectional view taken along the plane 2—2 of FIGURE 1.

Thus, it will be seen that the present invention provides a new and novel apparatus for and method of dispensing plasticized material from an elastic melt extruder at a pressure different from and preferably greater than pressures generated within the shearing zone of the extruder. The issuance of plasticized material at such different pressures may be continuous (as in the embodiment of FIGURES 1 and 2) or intermittent (as in the embodiment of FIGURES 3 and 4).

I claim:

1. An elastic melt extruder comprising a casing enclosing an interior chamber and including a plate having a pair of orifices located in an interior shearing surface, a pair of shear discs disposed in said chamber and having end faces closely spaced from said shearing surface to define therebetween separate shearing zones communicating through the orifices with a common outlet, means for rotating said discs and means for supplying particulate plastic material for passage through said shearing zones and issuance through said orifices, said discs each having a bore aligned with the corresponding orifice, and a reciprocable piston movable in each of said bores and through the corresponding shearing zone into the adjacent orifice to subject plasticized material therein to the pressure of the corresponding piston and independent of any pressure in the corresponding shearing zone, and a single check valve interposed between the orifices and the common outlet to prevent simultaneous communication between the outlet and both said orifices.

2. An elastic melt extruder comprising a casing enclosing a shearing chamber partially defined by a shearing surface having a pair of spaced orifices communicating through an accumulator space with a common outlet, a pair of rotatable shearing plates each aligned with one of said orifices and each having a face cooperating with the shearing surface to define therebetween a shearing gap, said shearing plates each having a bore therethrough aligned with the corresponding orifice, a plunger disposed in each of said bores for displacement therein between a retracted position at which the plunger lies within the confines of its shearing plate and an extended position at which the plunger projects from the plate across the shearing gap through the corresponding orifice and into the accumulator space, means for alternately displacing the plungers from their retracted positions to their extended positions and return, and valve means isolating the plungers from one another and connecting each plunger only during travel to its extended position with said common outlet.

3. In an elastic melt extruder having a casing enclosing a shearing chamber one radial wall of which is defined by a shearing surface having a central outlet opening and a rotatable shearing plate having a face cooperating with the shearing surface to define therebetween a shearing gap, the improvements of said rotatable shearing plate having a bore therethrough axially aligned with the outlet opening in said shearing surface, means defining an accumulator space lying outside the confines of said shearing chamber and aligned with said outlet opening and said bore to receive plasticized material from said shearing gap, said accumulator having an extrudate outlet, a plunger disposed in said bore for displacement therein between a retracted position at which the plunger lies within the confines of the shearing plate and said shearing gap communicates with said space through said outlet opening and an extended position at which the plunger projects from the plate across the shearing gap through the outlet opening and into said accumulator space, the plunger thus isolating the accumulator space from the shearing gap, and means for displacing the plunger from its retracted position to its extended position to displace the accumulated body of material from said accumulator space and through the extrudate outlet thereof.

4. In an elastic melt extruder having an enclosure enclosing a pair of relatively rotatable plates having spaced faces defining therebetween a shearing gap, one of said plates having a central outlet orifice, the improvements adapting said extruder to intermittent operation comprising the other of said plates having a bore therethrough aligned axially with the outlet orifice, means defining an accumulation chamber having an inlet communicating with said orifice and having an outlet for accumulated extrudate, a plunger disposed in said bore for displacement therein between (1) a retracted position at which the plunger lies wholly within the confines of said other plate and the chamber communicates with said shearing gap and (2) an extended position at which the plunger projects from the plate across the shearing gap through the outlet orifice and into the accumulation chamber to isolate said chamber from the shearing gap, first actuating means for displacing the plunger from its retracted position to its extended position and return, valve means controlling the expression of material from said chamber, said valve means being actuatable to a first position at which the chamber outlet is closed and to a second position at which the accumulation chamber outlet is open, second actuating means for said valve means, and control means for said valve actuating means and said plunger actuating means for simultaneously actuating said plunger from its position (1) to its position (2) and actuating said valve means from its first position to its second position to intermittently issue material from said accumulation chamber under the pressure of said plunger and completely independent of any pressure developed in said shearing gap.

5. The method of operating an elastic melt extruder having a pair of shearing zones communicating with a common outlet, the steps of concurrently introducing plastic material to both the shearing zones, continuously plasticizing material in said zones, separately accumulating bodies of plasticized material intermediate each of said zones, respectively, and said outlet, expressing accumulated material from one of said accumulated bodies at a pressure other than that generated in the corresponding one of said zones during the plasticizing of said material while material is being accumulated in the other of said bodies and cyclically reversing the relationship of said bodies to express accumulated material from said other body while material is being accumulated in said one of said bodies, so that a substantially continuous flow of plasticized material is obtained through the outlet at a pressure other than that generated in said zones.

References Cited in the file of this patent
UNITED STATES PATENTS

| | | |
|---|---|---|
| 2,366,417 | MacMillin | Jan. 2, 1945 |
| 2,668,986 | Miler | Feb. 16, 1954 |
| 2,704,380 | Cuzzi | Mar. 22, 1955 |
| 2,680,880 | Corbett | June 15, 1959 |
| 2,944,288 | Sherman | July 12, 1960 |
| 3,001,233 | Ernst | Sept. 26, 1961 |
| 3,032,814 | Miner | May 8, 1962 |
| 3,032,819 | Gasmire | May 8, 1962 |

FOREIGN PATENTS

| | | |
|---|---|---|
| 1,221,112 | France | May 31, 1960 |

OTHER REFERENCES

Maxwell and Scalora article, Oct. 1959, Modern Plastics, pages 107–114 and 202–210.